Patented Mar. 12, 1946

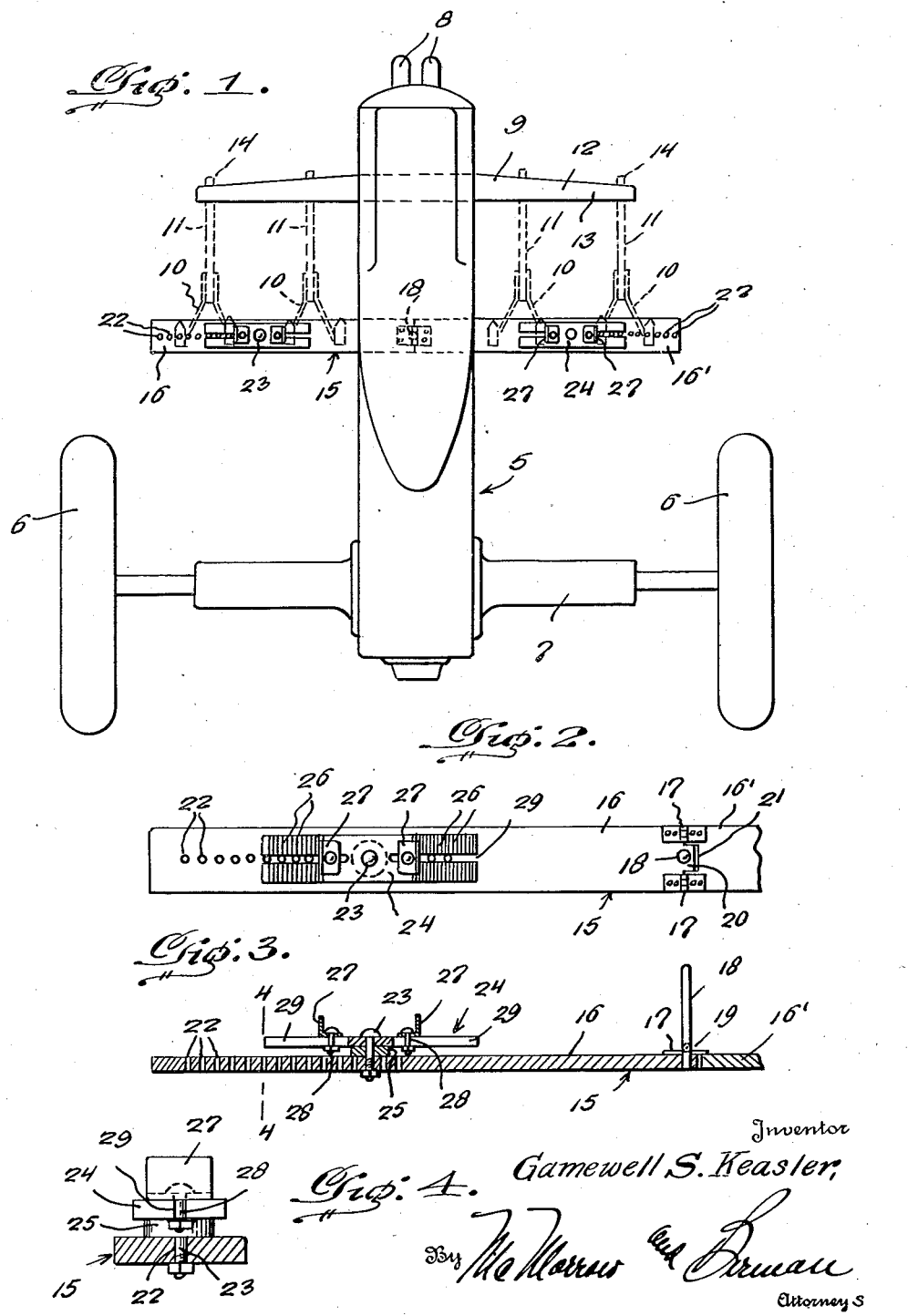

2,396,467

UNITED STATES PATENT OFFICE 2,396,467

PLOW AND CULTIVATOR GAUGE

Gamewell S. Keasler, Pendleton, S. C.

Application December 6, 1944, Serial No. 566,884

2 Claims. (Cl. 33—185)

This invention relates to gauges and more particularly to a device for facilitating the spacing of plow or cultivator tools at proper distances apart on the farm tractor or other vehicle carrying such tools.

The invention consists in the novel construction and arrangement of the several parts of the device and in the manner in which it is adaptable generally to use in connection with any conventional farm tractor or vehicle carrying the plow or cultivator tools.

A practical but non-limiting exemplification of the invention is illustrated in the accompanying drawing, in which:

Figure 1 is a top plan view of a conventional farm tractor illustrating the use of a device for positioning cultivator tools in laterally spaced relation in accordance with the present invention;

Figure 2 is a plan view, on an enlarged scale, illustrating more clearly details of construction;

Figure 3 is a view in partial longitudinal section and side elevation of the assembled parts shown in Figure 2; and Figure 4 is a cross-section on a line 4—4 of Figure 3.

Referring now to the drawing in detail, the numeral 5 designates generally a conventional farm tractor. The tractor, as usual, is provided with the usual ground wheels 6 fixed to and driven by the conventional rear axle assembly 7. At the front of the tractor are the usual steering wheel or wheels 8. The rest of the tractor being conventional and not illustrated in detail in the drawing.

Extending transversely of the tractor, near the forward end thereof, is the usual tool bar 9 to which conventional plow or cultivator tools 10 (shown in dotted lines in the drawing) are attached and thereby drawn in operation. This tool bar 9 may be of any approved or desired form. That is to say, may be of cylindrical cross-section and the leading ends of the drag bars 11 of the tools 10 may be formed and provided to be sleeved on the bar 9 and there held in adjusted spaced apart position. Or, obviously, the bar 9 may be of rectangular cross-section, thickened at its middle portion, and tapering, as at 12, on its front side as indicated in Figure 1, with its inner side 13 continuing in a straight plane from end to end thereof. In this latter mentioned form of the bar 9, the tool drag bars 11 may have their leading end portions 14 inserted and projected through apertures provided therefor in the bar and secured in place by retaining nuts or other securing devices in any conventional manner. The foregoing features of construction in the draw bar 9 and plow cultivator tool elements, in themselves, being conventional, the same are not illustrated in full detail.

The device of the present invention, as illustrated, comprises an elongated base or body member designated generally by the numeral 15. As shown, this base or body comprises two like half sections 16, 16', hinged together, as at 17, so as to be folded one section upon the other and thereby carried on the tractor or plow or cultivator tool carriage when not in use.

In use, the base or body 15 of the device is placed on the ground or a floor where the tractor 5 is located, said part 15 extending transversely of the tractor and being projected equally on opposite sides of the longitudinal axis of the tractor. To facilitate this equalized positioning of the part 15 it is provided with an upstanding pin, stud or post 18 of ample length to bring its upper end in close proximity to the bottom of the housing or casing of the motor, drive shaft or transmission gearing at a point substantially mid-way between the side frames of the chassis or body of the tractor. To get this standing locating element 18 out of the way in the folded condition of the device, said element is preferably hingedly mounted, as at 19, so that it can be folded down out of vertical position and back against the adjacent face portion of the base or body 15. In order to locate the positioning element 18 lined with the pivotal axis of the hinges 17, the hinged end portion of the section 16 of the base or body 15 is cut away at opposite sides to provide a central tongue portion 20 to which the element 18 is attached, the other base or body section 16' having its hinged end portion 21 cut out at the middle thereof so as to provide lateral bifurcations or tongues to which the hinge elements 17 are fastened, this provision together with the hinged mounting of the positioning element 18 permitting the folding of the device into a relatively small compass when not in use.

Each of the base or body sections 16, 16' is provided with a series of apertures 22 along a middle longitudinal line, as shown more clearly in Figures 2 and 3, said series of apertures 22 beginning at a point a short distance laterally from the adjacent side of the tractor body 5 and terminating near the outer end of the section 16 or 16', as the case may be. These apertures 22 are provided for the reception of a securing bolt 23 by which a supplemental gauge element 24, now described in detail, is detachably and adjustably secured to the base or member or body 15.

As shown, the element 24 comprises a rectangular plate apertured at the middle thereof for the reception of the attaching bolt 23, and this element 24, as shown in Figure 3, is preferably spaced from the adjacent face of the base or body 15 by an interposed washer 25 sleeved on the bolt 23. The element 24 is of such a length that it extends a substantial distance on opposite sides of the attaching bolt 23 and its top face is marked with transverse lines 26 spaced a fraction of an inch apart (for practical purposes one-half inch apart) thus producing a scale, the respective markings of which may be designated by sequential numbering for the selective positioning of adjustable stop elements 27 which may be L-shaped as shown in the drawing or of any other desired form. As shown, the stop elements 27 have their horizontal base flanges provided with securing bolts 28 which are inserted through longitudinal slots 29 provided in the member 24, said bolts 28 being fastened in the adjusted position of the stops 27 by retaining nuts which are tightened against the adjacent under face portion of the element 24.

From the foregoing it is readily apparent that the desired spaced apart lateral adjustment of the conventional plow or cultivator tools 10 is easily, quickly and accurately effected by placing the body base 15 of the device on the ground or floor under the tractor 5 and positioning the device by bringing the locating element 18 thereof into registering coincidence with the longitudinal center of the tractor, as hereinabove described, and then adjusting the respective stop members on the gauge bars or plates 24, said bars or plates 24 having been previously positioned for the purpose longitudinally of the respective base or body sections 16, 16'. With the stop elements 27 set in their properly spaced relation for a definite spacing between the respective plow or cultivator tools 10, said tools are then brought into contact with their particular correlated stop elements 27, whereupon the tool drag bars 11 are accordingly fastened to the transverse tool bar 9. With the adjustment and setting of the respective plow or cultivator tools 10 thus accomplished, the gauge device is moved from under the tractor, and if not needed for immediate re-use it can be folded and placed on the tractor for transportation therewith.

The illustrated structure is but one practical exemplification of the invention and the same may be modified within the spirit and scope of the appended claims. The invention, therefore, is not limited to the species of the construction and arrangement shown.

Having thus described the invention, what is claimed is:

1. A gauge device for locating plow or cultivator tools in lateral spaced apart relation to each other as carried by a transverse tool bar on a conventional farm tractor or other plow or cultivator tool carriage, said gauge device comprising an elongated body or base member to be placed under and extending transversely of the tractor or carriage, said body or base member having a central positioning element for registration in coincidence with the longitudinal axis of the tractor or carriage, whereby said body or base member is extended equally on opposite sides of the tractor or carriage, supplemental gauge elements comprising elongated bars adjustable longitudinally of the base or body member, adjustable stop elements movable longitudinally on said supplemental gauge members and means for releasably fastening said stop elements in adjusted spaced relation to each other.

2. The structure of the device as set forth in claim 1, wherein the supplemental gauge members have longitudinal slots in the opposite end portions thereof and transverse scale markings on their upper faces, and the adjustable stop members have securing bolts working in the longitudinal slots of said supplemental gauge elements for securing said stop members in their respective spaced apart adjusted positions.

GAMEWELL S. KEASLER.